United States Patent [19]

Akesaka et al.

[11] 4,311,411
[45] Jan. 19, 1982

[54] PIPE JACKING APPARATUS

[75] Inventors: Toshio Akesaka, Yano; Takeshi Hada, Tokyo, both of Japan

[73] Assignees: Kabushiki Kaisha Iseki Kaihatsu Koki; Kabushiki Kaisha Aoki Kensetsu, both of Japan

[21] Appl. No.: 139,799

[22] Filed: Apr. 14, 1980

[30] Foreign Application Priority Data

Apr. 21, 1979 [JP] Japan .................................. 54-49559

[51] Int. Cl.³ .............................................. F16L 1/00
[52] U.S. Cl. ...................................... 405/184; 299/1; 405/143
[58] Field of Search ............... 405/184, 146, 141, 140, 405/138, 131, 145, 143; 299/1, 18

[56] References Cited

U.S. PATENT DOCUMENTS

| | | | |
|---|---|---|---|
| 3,356,167 | 12/1967 | Trent | 405/184 X |
| 3,498,673 | 3/1970 | Ledray et al. | 299/1 |
| 3,517,966 | 6/1970 | Montacie | 299/1 |
| 3,560,753 | 2/1971 | Beug | 299/1 X |
| 3,907,045 | 9/1975 | Dahl et al. | 299/1 X |
| 4,020,641 | 5/1977 | Takada | 405/184 |
| 4,072,021 | 2/1978 | Yamazaki | 405/146 |
| 4,238,828 | 12/1980 | Hay et al. | 299/1 |

Primary Examiner—Dennis L. Taylor
Attorney, Agent, or Firm—Kane, Dalsimer, Kane, Sullivan and Kurucz

[57] ABSTRACT

A pipe jacking apparatus comprises a shield type tunneling machine equipped with direction adjusting jacks, a tubular body joined to the rear of the shield type tunneling machine, and a thrust jack provided within a thrust pit and thrusting forward a pipe member placed between the shield tunneling machine and the thrust jack, in cooperation with the shield type tunneling machine. The aforesaid tubular body includes a panel therein having output gages for the aforesaid jacks and a mark representing the center of the tubular body, and a TV camera for taking a picture of the panel. This TV camera is connected to a TV receiver provided in a remote control unit. In the aforesaid pit, there is provided an optical unit having a line of collimation directed to a predetermined direction to thrust a pipe, or a light source for light beams. A pipe is driven forward while a discrepancy between the line of collimation or the light beam and the center mark is being eliminated by remote-controlling the outputs of the aforesaid jacks. This apparatus is particularly fit for use in laying a diametrically small sewer pipe in the ground.

4 Claims, 2 Drawing Figures

PIPE JACKING APPARATUS

BACKGROUND OF THE INVENTION

1. Field of the Invention

This invention relates to a pipe jacking apparatus, and more particularly to a pipe jacking apparatus adapted for being operated under remote control.

2. Description of the Prior Art

Generally, in laying a pipe, such as a sewer pipe, in the ground according to a pipe-jacking method, it has been customary that a shield type tunneling machine constituting a pipe jacking apparatus takes in charge of tunneling and withdrawal of muck; and a hydraulic thrust jack drives forward along a predetermined linear path a pipe, such as a reinforced concrete pipe, placed between the shield type tunneling machine and the thrust jack, in cooperation with the shield tunneling machine.

The shield type tunneling machine must be driven forward along a predetermined linear path by a thrust of the thrust jack. However, the shield type tunneling machines suffers from a variation in tunneling resistance due to a geological change, tending to divert from a predetermined linear path. A direction of moving shield type tunneling machine thus must be rectified. The tunneling machine in general is equipped with plural direction-adjusting jacks for rectifying a direction of moving shield type tunneling machine, and the outputs of respective direction-adjusting jacks are changed so as to rectify a direction of moving shield tunneling machine.

These direction-adjusting jacks, whether the shield type tunneling machine used is a pneumatic type or a sludge pressing type, is operated by an operator stationed at an atmospheric pressure zone at the rear of a partition wall in the shield tunneling machine. With a diametrically large shield tunneling machine for use in thrusting a pipe having a comparatively large inner diameter, for example, a pipe having a diameter of more than 900 mm, no problem arises in stationing at the shield tunneling machine an operator who operates the direction-adjusting jacks individually or collectively. On the other hand, a diametrically small shield tunneling machine for use in thrusting a pipe having a comparatively small diameter, for example, a sewer pipe having a diameter of 800 to 600 mm on the design, can not afford to station the operator thereat. Accordingly, even in the case where a diametrically small pipe is needed, a pipe having a diameter larger than required, for example, a pipe having a diameter of larger than 900 mm, and a shield type tunneling machine designed for thrusting such a diametrically large pipe must be employed, resulting in poor economy.

Furthermore, adjustment of a direction of moving shield type tunneling machine must be conducted by an operator according to instructions of a surveyor who makes a survey on a course of moving shield type tunneling machine by means of an optical unit, such as a transit, provided in a pit for thrusting the shield type tunneling machine into the ground. However, if a surveyor desires to know a degree of displacement of the shield tunneling machine from a predetermined course by means of light beams, such as laser beam, provided in the pit, the operator would intercept the optical path of the light beam to be irradiated to a target, namely, a center mark in the shield type tunneling machine, with the result that the light beam fails to reach the center mark.

SUMMARY OF THE INVENTION

It is accordingly an object of the present invention to provide a pipe jacking apparatus, wherein a direction of tunneling by a shield type tunneling machine is adjusted under remote control by an operator standing in a thrust pit or on the ground, without an operator being stationed at the shield type tunneling machine, whereby the drawbacks experienced with a prior art device, particularly in adjusting a direction of tunneling, are completely eliminated.

To attain the object, there is provided according to the present invention a pipe jacking apparatus, which comprises; a shield type tunneling machine including a shield body, a partition wall in the shield body, a cutter head carried by the partition wall and operated by an electric motor, means for discharging muck from the front of the partition wall to the rear, and plural direction-adjusting jacks attached at one ends thereof to the shield body; a tubular body disposed at the rear of the shield type tunneling machine, with the leading end thereof maintained in engagement with the other ends of the direction-adjusting jacks, the tubular body including a panel having therein output gages for the direction-adjusting jacks and center marks provided in coincidence with the center of the tubular body, and a TV camera for photographing the panel; a thrust jack disposed in a thrust pit for the shield type tunneling machine and exerting a thrust on a pipe member which is to be placed between the thrust jack and the aforesaid tubular body; an optical unit with a line of collimation directed to a predetermined pipe-jacking direction or a light source for emitting light beams to the aforesaid predetermined pipe-jacking direction; and an operation panel for operating a TV receiver installed in the thrust pit or on the ground and the direction-adjusting jacks; whereby an operator operates the operation panel so as to change outputs of respective direction-adjusting jacks, according to a degree of discrepancy between the center mark and the line of collimation or a point of irradiation of light beam, while watching the output gages for the direction-adjusting jacks displayed on the screen of the TV receiver, whereby the aforesaid discrepancy is eliminated.

The other object and features of the present invention will be apparent from the ensuring part of the specification in conjunction with the drawings which indicate a preferred embodiment of the present invention.

DESCRIPTION OF THE PREFERRED EMBODIMENTS

Figure 1:
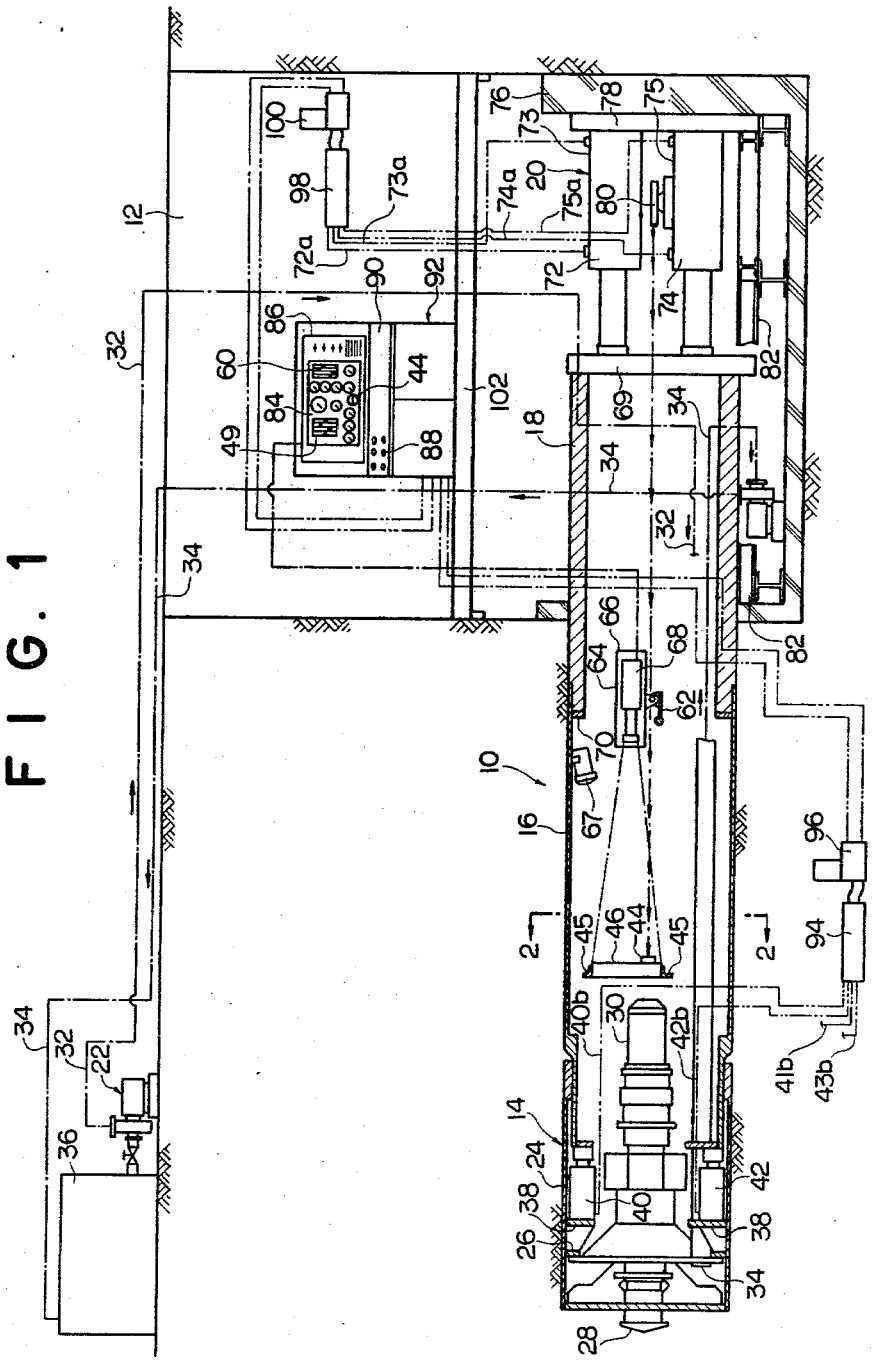
FIG. 1 is a longitudinal cross sectional view of a pipe jacking device, wherein a pipe is driven forward; and, FIG. 2 is a transverse cross sectional view taken along the line 2—2 of FIG. 1.

Referring to FIG. 1, a pipe jacking apparatus 10 generally comprises a sludge pressurizing, shield type tunneling machine 14, a tubular body 16 disposed at the rear of the tunneling machine 14, a thrust jack 20 for driving forward a reinforced concrete pipe 18, which is to be joined to a preceding pipe with the progress of the jacking operation, together with the tubular body 16 and the tunneling machine 14 both of which are positioned ahead of the pipe, and a sludge treatment equipment 22 installed on the ground.

The tunneling machine 14 includes a shield skin, namely, a tubular shield body 24, a partition wall 26 provided across the shield body, a cutter head 28 carried by the partition wall, and an electric motor 30 which is a drive source for running the cutter head. There is defined at the front of the partition wall 26 a pressure zone filled with pressurized sludge which is supplied through a sludge transportation pipe 32. The sludge introduced into the pressure zone is transported through a sludge withdrawal pipe 34 to a sludge treatment tub 36 installed on the ground.

Two pairs of left and right direction-adjusting jacks 40,41,42 and 43 are provided in the upper and lower stages within the shield body 24 (FIG. 2) in parallel to the axis of the shield body, respectively. Respective direction-adjusting jacks are attached at one end thereof to the shield body through the medium of a bracket 38.

Figure 2:
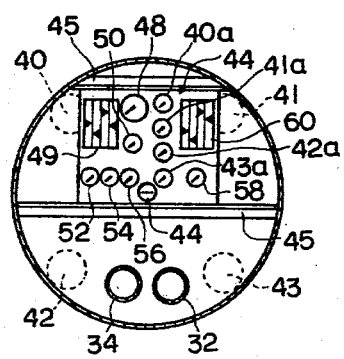

The tubular body 16 positioned at the rear of the shield type tunneling machine 14 has the leading end maintained in engagement with the trailing ends of the direction-adjusting jacks. The tubular body 16 lodges therein a panel 46 having thereon various meters or gages and a center mark 44. The panel 46 is held in place within the tubular body by means of a pair of attaching members 45 in a manner that the center mark 44 is in coincidence with the central axis of the tubular body 16. The panel 46 is provided with gages 40a,41a,42a and 43a for indicating the outputs, namely, loads of the direction-adjusting jacks 40,41,42 and 43, as best seen in FIG. 2. Such gages may be provided on the panel, according to necessity: for example, a stroke indicator for respective direction-adjusting jacks, a cutter head-earth pressure gage 48, a pit-opening and closing oil pressure gage 49, sludge pressure gages 52,54,56, and oil pressure gage 58 for operating a valve for transportation of sludge, and a valve aperture gage 60 for a sludge transportation line.

A TV camera device 64 is attached by a mounting means 62 to the inner wall of the tubular body at the rear of the panel 46 at a spacing therefrom, and includes a casing 66 and a TV camera 68 lodged therein. The TV camera 68 usually takes a picture of various gages and that of the center mark 44 on the panel 46. An illumination unit 67 for irradiating the panel 46 is provided in the tubular body 16. Where a large size panel 46 is desired, or in order for an operator to read with ease various gages displayed on the screen of the TV receiver, it is recommended to provide plural TV camera sets and illumination units.

The thrust jack 20 is equipped with a thrust wheel 69, and the reinforced concrete pipe 18 is placed between the thrust wheel and a pipe receiving portion 70 formed in the rear end portion of the tubular body 16. The thrust jack 20 further comprises a pair of left and right upper hydraulic jacks 72,73 and a pair of left and right lower hydraulic jacks 74,75, all of which are attached at one ends thereof to the thrust wheel 69 and at the other ends thereof to a connecting member 78 pressed against a reaction force wall 76.

Within the pit 12, an optical unit, such as a transit, is provided, with the line of collimation thereof being in coincidence with the center line of a predetermined pipe-jacking tunnel, or a light source 80 for emitting light beams, such as laser beam, is provided on the center line thereof. As an alternative, another TV camera set (not shown) may be provided and connected to the aforesaid optical unit, so that the optical unit can be seen on the screen of the TV receiver, instead of a surveyor directly seeing the line of collimation.

There is provided at the bottom of the pit 12 a support or table 82 for bringing the reinforced concrete pipe 18 to be joined and the thrust jack 20 in alignment with each other on a given level and in a predetermined direction.

There is provided in the pit 12 an operation unit 92 in which are incorporated a TV receiver 86 and an operation panel 90, the TV receiver being connected to the TV camera 68 and having a screen 84 on which the images of various gages and that of the center mark 44 provided on the panel 46 are displayed by way of the TV camera, and the operation panel having thereon various operation buttons 88 for operating various appliances, the states of operation of which are known from the gages displayed on the screen 84 of the TV receiver, and for controlling the outputs of the direction-adjusting jacks 40 through 43. Where another TV camera is provided and connected to the optical unit, as described above, a TV receiver preferably be provided in the operation unit 92. More in detail, the TV receiver is connected to the TV camera 68; hydraulic lines 40b,41b,42b and 43b of four direction-adjusting jacks 40 through 43 are connected to the operation panel 90 by way of an electromagnetic valve 94 in the shield type tunneling machine 14 and a hydraulic unit 96; and hydraulic lines 72a,73a,74a and 75a of four thrusting jacks 72 through 75 are connected by way of an electromagnetic valve 98 and a hydraulic unit 100 to an operation panel 90.

A TV receiver separate from the TV receiver 86 and another TV receiver for displaying the line of collimation of the optical unit 80 may be provided in the operation unit 92, and a TV camera for taking a picture of the sludge disposal equipment including the discharged sludge treating tub 36 may be installed on the ground, so that the informations relating to sludge treatment which have been photographed by the TV camera on the ground are displayed on the screen of the TV receiver, and the sludge transportation equipments can be centrally operated on the operation panel 90.

The operation panel 92 should preferably be provided in the bottom portion of the pit 12 or on a support beam 102 provided in the middle stage of the pit 12 as seen in FIG. 1. As an alternative, the operation unit may be provided on the ground.

The pipe jacking apparatus is operated under remote control by an operator who is constantly watching the screen of the TV receiver 86. Adjustment of a direction of moving shield type tunneling machine is carried out, based on the survey of a surveyor or recognition of an operator as to whether or not the center mark 44 and the line of collimation or the point of irradiation of light beam meet each other on the screen of the TV receiver. Stated otherwise, if there is found any discrepancy between the center mark 44 and the line of collimation or the point of irradiation of the light beam, the direction-adjusting jacks are operated to rectify the discrepancy. Thus, displacement of the shield type tunneling machine from a regular course is eliminated while the machine is being driven forward. The shield type tunneling machine thus resumes the regular course.

In this embodiment, there is employed the sludge pressurizing, shield type tunneling machine, and an air pressurizing type shield tunneling machine may be employed.

According to the present invention, the state of the direction-adjusting jacks operating in the shield type tunneling machine as well as a course of thrusting tubular body and that of a pipe member which follows the shield type tunneling machine are known correctly and precisely by an operator, stationed outside the shield tunneling machine. By virtue of the TV receiver installed outside the pipe-jacking apparatus, the operator can learn the informations necessary for operating the pipe jacking apparatus from various gages for indicating the states of operations of the direction-adjusting jacks and other appliances, as if the operator were stationed at the shield type tunneling machine. Thus, various appliances and machines centrally provided outside the pipe jacking apparatus are operated by an operator operating the buttons on the operation panel.

Various disadvantages accuring from the fact that an operator must be stationed at the shield type tunneling machine are thus eliminated. The pipe jacking apparatus according to the present invention permits to directly drive exactly on a predetermined course in the ground even a diametrically small pipe which can not afford to let an operator in.

We claim:

1. A pipe jacking apparatus comprising;
    a shield type tunneling machine equipped with plural direction-adjusting jacks;
    a tubular body disposed at the rear of said shield type tunneling machine in engagement with said direction-adjusting jacks, and having therein output gages for indicating the outputs of said direction-adjusting jacks, a panel having thereon a center mark maintained in coincidence with the central axis of said tubular body, and a TV camera for taking a picture of the panel;
    a thrust jack disposed in a thrust pit for the shield type tunneling machine and exerting a thrust on a pipe member which is to be placed between said thrust jack and said tubular body;
    an optical unit disposed within said thrust pit, with the line of collimation thereof direction to a predetermined direction of jacking pipe member, or a light source for irradiating light beam to said predetermined direction of jacking pipe member; and,
    an operation panel for operating a TV receiver installed within said thrust pit or on the ground, as well as said direction-adjusting jacks.

2. A pipe jacking apparatus as defined in claim 1, wherein said optical unit is connected to a TV camera, and said TV camera is connected to a TV receiver.

3. A pipe jacking apparatus as defined in claim 1, wherein various gages including stroke indicators for said direction-adjusting jacks, a cutter-head-earth pressure gage, a pit opening and closing oil pressure gage are provided on said panel, said gages being displayed on a screen of said TV receiver by way of said TV camera for photographing the center mark.

4. A pipe jacking apparatus as defined in claim 1, wherein said TV receiver and said operation panel are connected to each other in a single operation unit.

* * * * *